US012794567B2

(12) United States Patent
Ueno

(10) Patent No.: US 12,794,567 B2
(45) Date of Patent: Nov. 10, 2026

(54) SUBMARINE BRANCHING APPARATUS AND CONTROL METHOD OF SUBMARINE BRANCHING APPARATUS

(71) Applicant: NEC Corporation, Tokyo (JP)

(72) Inventor: Ryuji Ueno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 242 days.

(21) Appl. No.: 18/668,497

(22) Filed: May 20, 2024

(65) Prior Publication Data

US 2024/0430015 A1 Dec. 26, 2024

(30) Foreign Application Priority Data

Jun. 20, 2023 (JP) ................................ 2023-100740

(51) Int. Cl.
*H04B 10/80* (2013.01)

(52) U.S. Cl.
CPC ......... *H04B 10/807* (2013.01); *H04B 10/808* (2013.01)

(58) Field of Classification Search
CPC ............................ H04B 10/807; H04B 10/808
See application file for complete search history.

(56) References Cited

U.S. PATENT DOCUMENTS

| | | | | | |
|---|---|---|---|---|---|
| 6,157,098 | A * | 12/2000 | Kojima | ................ | H04B 10/808 361/191 |
| 10,153,850 | B2 * | 12/2018 | Aida | ........................ | H04B 3/44 |
| 2003/0015921 | A1 * | 1/2003 | Kumayasu | ............... | H04B 3/44 307/131 |
| 2003/0230936 | A1 * | 12/2003 | Muramatsu | .............. | H04B 3/44 307/69 |
| 2005/0152443 | A1 * | 7/2005 | Ueno | .................... | H04W 88/02 375/224 |
| 2014/0103739 | A1 * | 4/2014 | Takigawa | ................ | H04B 3/44 307/112 |

FOREIGN PATENT DOCUMENTS

| | | | | | |
|---|---|---|---|---|---|
| EP | 0300440 | B1 * | 3/1994 | ............. | H03K 17/22 |
| EP | 2523297 | B1 * | 3/2014 | ............... | H04B 3/36 |
| EP | 2523356 | B1 * | 2/2019 | ............... | H04B 3/44 |
| JP | 2002057607 | A * | 2/2002 | ........... | H04B 10/806 |

* cited by examiner

*Primary Examiner* — David C Payne
*Assistant Examiner* — Mohammed Abdelraheem

(57) ABSTRACT

Provided is a submarine branching apparatus including: a power feed switching control circuit configured to convert a relay-switching optical command signal into an electric signal; a relay drive circuit configured to be connected to the power feed switching control circuit, receive the electric signal, and change a power feed path; and an automatic reset circuit configured to be connected to the power feed switching control circuit, receive the electric signal, and reset the power feed switching control circuit. Herein, the automatic reset circuit is connected to the power feed switching control circuit via a first time constant circuit delaying the electric signal.

9 Claims, 5 Drawing Sheets

SUBMARINE BRANCHING APPARATUS AND CONTROL METHOD OF SUBMARINE BRANCHING APPARATUS

INCORPORATION BY REFERENCE

This application is based upon and claims the benefit of priority from Japanese patent application No. 2023-100740, filed on Jun. 20, 2023, the disclosure of which is incorporated herein in its entirety by reference.

TECHNICAL FIELD

The present disclosure relates to a submarine branching apparatus and a control method of the submarine branching apparatus.

BACKGROUND ART

Japanese Unexamined Patent Application Publication No. 2002-57607 discloses a power feed switching method, a power feed path branching apparatus, and a power feed switching system that are capable of switching a power feed path in a state where a power feed path system is stable, and furthermore capable of eliminating a restriction to a point where the power feed path is switched. Switching of a power feed path is performed by controlling a connection configuration of the power feed path at a branch point of a submarine cable transmission path that performs communication by using an optical fiber, based on a control signal superimposed on an optical signal being transmitted by the optical fiber.

SUMMARY

However, the power feed path branching apparatus described in Japanese Unexamined Patent Application Publication No. 2002-57607 is a circuit being driven when a fault occurs in a power feed path, not to prevent a fault from occurring. In view of this, an example object of the present disclosure is to provide a submarine branching apparatus that restarts and resets a power feed switching control circuit without stopping a system.

A submarine branching apparatus according to the present disclosure is a submarine branching apparatus including:

- a power feed switching control circuit configured to convert a relay-switching optical command signal into an electric signal;
- a relay drive circuit configured to be connected to the power feed switching control circuit, receive the electric signal, and change a power feed path; and
- an automatic reset circuit configured to be connected to the power feed switching control circuit, receive the electric signal, and reset the power feed switching control circuit.

A control method of a submarine branching apparatus according to the present disclosure is a control method of a submarine branching apparatus including:

- converting, by a power feed switching control circuit, a relay-switching optical command signal into an electric signal;
- receiving the electric signal, and changing a power feed path; and
- receiving the electric signal, and resetting the power feed switching control circuit.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Example Embodiment

Hereinafter, an example embodiment of the present disclosure will be described with reference to the drawings. However, the disclosure of the claims is not limited to the following example embodiment. Further, not all of the configurations to be described in the example embodiment are essential as a solution to the problem. For clarification of illustration, the following descriptions and drawings will be omitted and simplified as appropriate. In each of the drawings, the same components are assigned with the same reference signs, and duplicated description therefor will be omitted as needed.

(Description of Submarine Branching Apparatus According to Example Embodiment)

Figure 1:
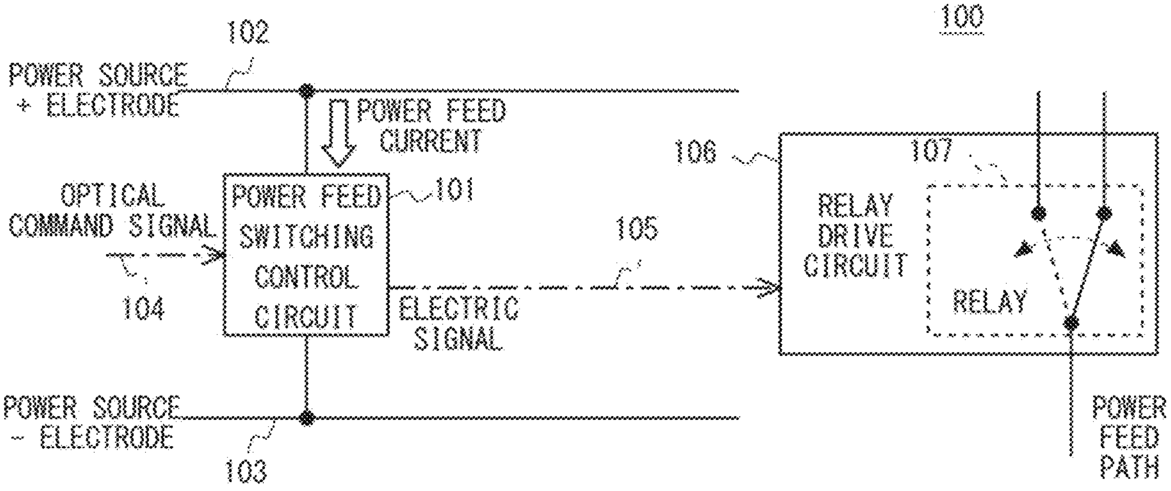
FIG. 1 is a circuit diagram of a related submarine branching apparatus.
Figure 2:
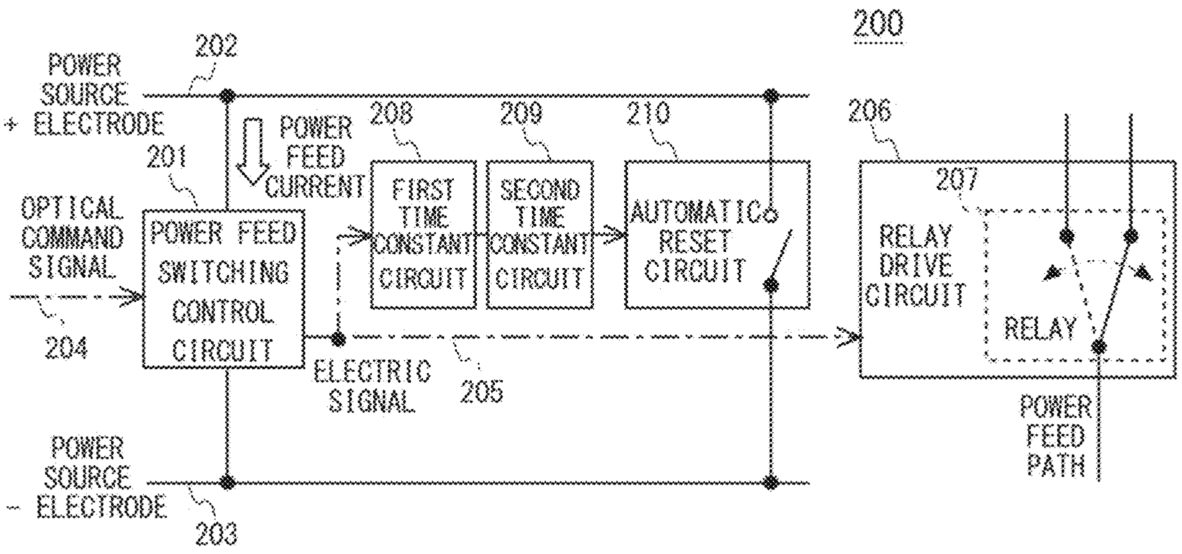
FIG. 2 is a circuit diagram of a submarine branching apparatus according to the present disclosure.

FIG. 1 is a circuit diagram of a related submarine branching apparatus. FIG. 2 is a circuit diagram of a submarine branching apparatus according to the present disclosure. Description will be given with reference to FIGS. 1 and 2. The submarine branching apparatus is an apparatus arranged underseas for communication between base stations using an optical fiber, and includes an apparatus that switches a power feed path.

The submarine branching apparatus is equipped with a control circuit for controlling a relay being a switch of a power feed path. As illustrated in FIG. 1, a submarine branching apparatus 100 includes a power feed switching control circuit 101, a first power source line 102, a second power source line 103, and a relay drive circuit 106 that includes a relay 107.

The power feed switching control circuit 101 issues an electric signal 105 upon receiving an optical command signal 104 from outside. The electric signal 105 is input to the relay drive circuit 106 to drive the relay 107 and switch a power feed path.

If the power feed switching control circuit 101 operates abnormally underseas such as freezing due to some cause, power feed switching is impossible because the electric signal 105 for relay driving is not issued even when the optical command signal 104 is sent to the power feed switching control circuit 101. When this state continues for a long period of time, there is a risk that the submarine branching apparatus 100 may break down.

In order to escape from the power feed switching impossible state, it is necessary in the current design to restart the power feed switching control circuit 101 with an operation of once dropping power feed to and then restarting the submarine branching apparatus 100. This means that power feed and operation of the entire system has to be temporarily stopped. Thus, it has been desired to implement such a function that allows only the power feed switching control circuit 101 to be restarted without stopping the system operation, and to be prepared in case of an abnormal operation.

As illustrated in FIG. 2, a submarine branching apparatus 200 according to the present disclosure includes a power feed switching control circuit 201, a first power source line 202, a second power source line 203, a relay drive circuit 206 that includes a relay 207, and an automatic reset circuit 210. The submarine branching apparatus 200 further includes a first time constant circuit 208 and a second time constant circuit 209.

The power feed switching control circuit 201 converts a relay-switching optical command signal 204 into an electric signal 205. The power feed switching control circuit 201 is connected to the first power source line 202 and the second power source line 203, through which power feed current flows.

The relay drive circuit 206 is connected to the power feed switching control circuit 201. The relay drive circuit 206 includes the relay 207 that receives the electric signal 205 from the power feed switching control circuit 201 and changes a power feed path.

The automatic reset circuit 210 is connected to the power feed switching control circuit 201. The automatic reset circuit 210 receives the electric signal 205 from the power feed switching control circuit 201 and resets the power feed switching control circuit 201. The automatic reset circuit 210 is configured by a switch between the first power source line 202 and the second power source line 203. The automatic reset circuit 210 short-circuits between the first power source line 202 and the second power source line 203, and thereby resets the power feed switching control circuit 201.

The automatic reset circuit 210 is connected to the power feed switching control circuit 201 via the first time constant circuit 208, and the first time constant circuit 208 delays the electric signal 205. The automatic reset circuit 210 is connected to the power feed switching control circuit 201 via the second time constant circuit 209, and the second time constant circuit 209 sustains a state of reset.

The power feed switching control circuit 201 is energized between the first power source line 202 and the second power source line 203 after being reset, and thereby returns to a normal operation.

As described above, the automatic reset circuit 210 is provided that has a function of forcibly powering on/off only the power feed switching control circuit 201 while power is fed to the submarine branching apparatus 200. This enables the power feed switching control circuit 201 to be restarted and reset without stopping the system, thereby eliminating an abnormal operation.

Requirements for the automatic reset circuit 210 are 1 to 3 below.

1. The automatic reset circuit should be operated in combination with relay switching. This is because an abnormal operation such as freezing is unlikely to occur suddenly under a normal steady state, and if occurs, the abnormal operation is likely to occur in a transient state such as when switching power feed.
2. The power feed switching control circuit 201 should be powered off after relay switching is securely completed. This is because relay switching cannot be performed when the power feed switching control circuit 201 is powered off first.
3. The power feed switching control circuit 201 should be powered on after the transient state during power feed switching has settled down to the steady state. This is because power-on during the transient state may cause an abnormal operation of the power feed switching control circuit 201 due to a transient phenomenon, making it meaningless to once reset the power feed switching control circuit 201.

Thus, the automatic reset circuit 210 is connected to the power feed switching control circuit 201 in parallel. First, for achieving the requirement 1, a signal for driving the relay 207 is branched and input to the automatic reset circuit 210 as well. This enables the automatic reset circuit 210 to be driven triggered by relay switching. Next, for achieving the requirements 2 and 3, two time constant circuits are connected in conjunction with the automatic reset circuit 210 to adjust timing of powering on/off the control circuit.

(Description of Control Method of Submarine Branching Apparatus According to Example Embodiment)

Figure 3:
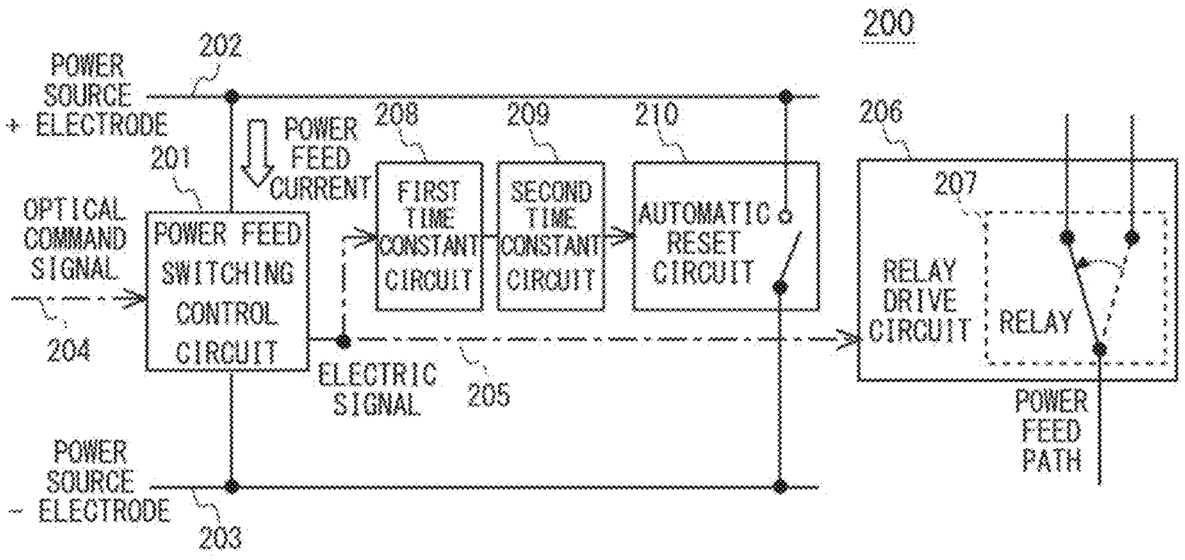
FIG. 3 is a first circuit diagram illustrating a control method of a submarine branching apparatus according to the present disclosure.
Figure 4:
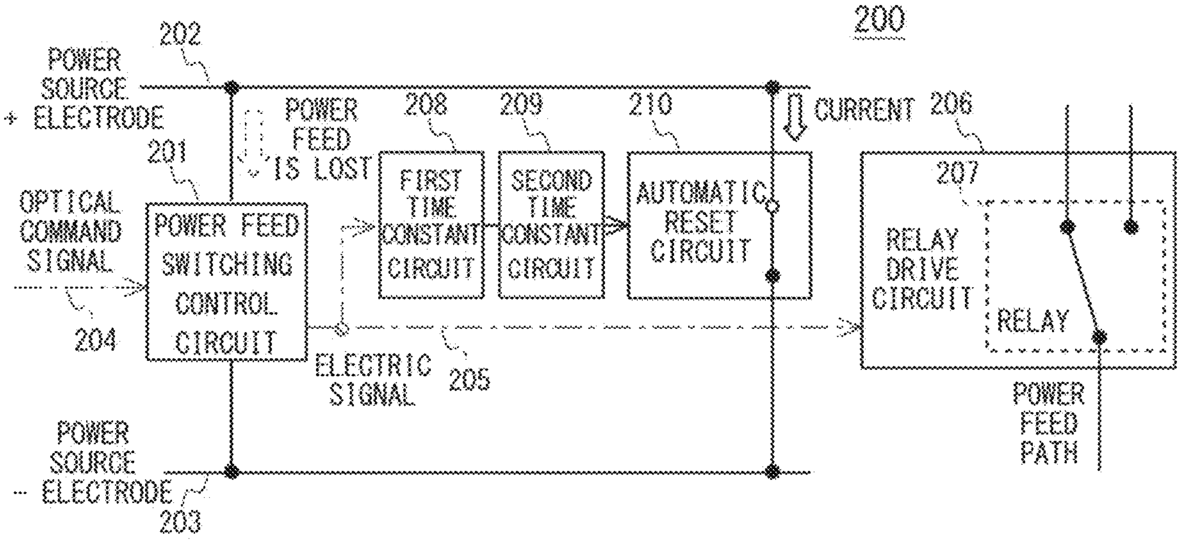
FIG. 4 is a second circuit diagram illustrating a control method of the submarine branching apparatus according to the present disclosure.
Figure 5:
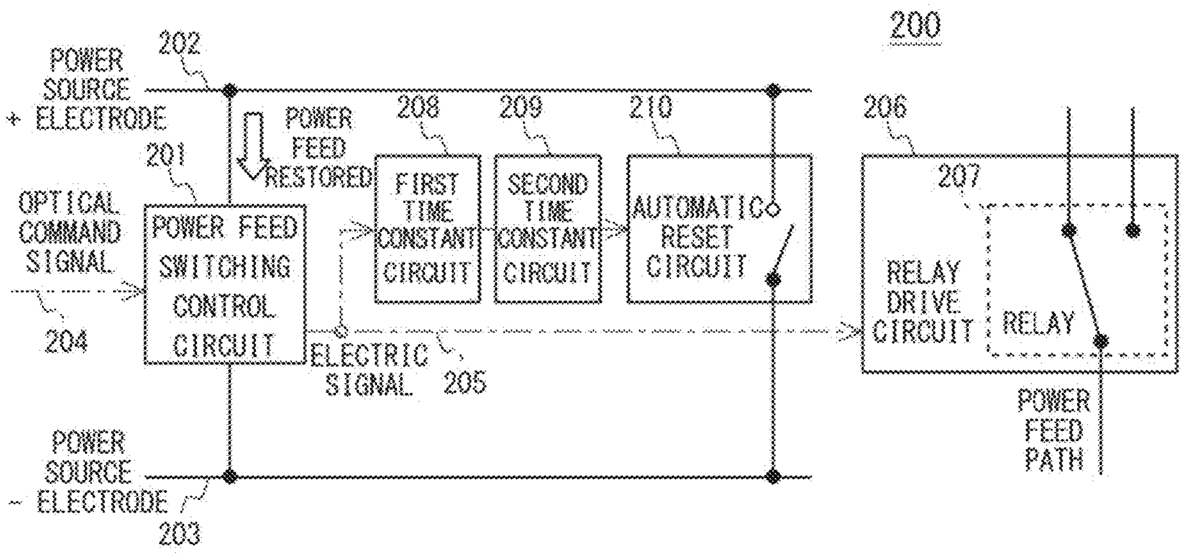
FIG. 5 is a third circuit diagram illustrating a control method of the submarine branching apparatus according to the present disclosure.

FIG. 3 is a first circuit diagram illustrating a control method of a submarine branching apparatus according to the present disclosure. FIG. 4 is a second circuit diagram illustrating a control method of the submarine branching apparatus according to the present disclosure. FIG. 5 is a third circuit diagram illustrating a control method of the submarine branching apparatus according to the present disclosure. Description will be given with reference to FIGS. 3 to 5.

As illustrated in FIG. 3, the relay 207 is switched by the electric signal 205 from the power feed switching control circuit 201. At this time, the first time constant circuit 208 delays input of the electric signal 205 to the automatic reset circuit 210 and allows time to elapse in such a way that the automatic reset circuit 210 is not started before the relay 207 is switched.

As illustrated in FIG. 4, after relay switching is completed, the electrical signal 205 delayed by the first time constant circuit 208 enters the automatic reset circuit 210. Triggered by the electric signal 205, the automatic reset circuit 210 short-circuits between the first power source line 202, being a positive electrode, and the second power source line 203, being a negative electrode, of the power feed switching control circuit 201. A current to be originally supplied to the power feed switching control circuit 201 is drawn into the automatic reset circuit 210, thereby powering down the power feed switching control circuit 201. The short circuit between the first power source line 202 and the second power source line 203 brings the power feed switching control circuit 201 into a state of reset. The second time constant circuit 209 sustains a short-circuit state during the transient state immediately after power feed switching, and maintains the state for a fixed period of time.

As illustrated in FIG. 5, after the transient state settles down to the steady state, the short circuit is released and power is restored to the power feed switching control circuit 201.

The automatic reset circuit 210 is a function of momentarily dropping only power of the power feed switching control circuit 201 and then restarting the power feed switching control circuit 201. Thus, the power feed switching control circuit can be restarted without causing any system failure such as a communication breakdown, preventing a phenomenon such as failing to switch power feed due to an abnormal operation of the power feed switching control circuit.

The control method of the submarine branching apparatus can be achieved by causing the submarine branching apparatus 200 to execute a program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the present disclosure has been described with reference to the example embodiment, the present disclosure is not limited to the above-described example embodiment. Various modifications that can be understood by those skilled in the art can be made to the configurations and details of the present disclosure within the scope of the present disclosure. Each example embodiment can be combined with another example embodiment as appropriate.

The whole or part of the exemplary embodiments disclosed above can be described as, but not limited to, the following supplementary notes.

(Supplementary Note 1)

A submarine branching apparatus including:

a power feed switching control circuit configured to convert a relay-switching optical command signal into an electric signal;

a relay drive circuit configured to be connected to the power feed switching control circuit, receive the electric signal, and change a power feed path; and an automatic reset circuit configured to be connected to the power feed switching control circuit, receive the electric signal, and reset the power feed switching control circuit.

(Supplementary Note 2)

The submarine branching apparatus according to supplementary note 1, wherein the automatic reset circuit is connected to the power feed switching control circuit via a first time constant circuit configured to delay the electric signal.

(Supplementary Note 3)

The submarine branching apparatus according to supplementary note 1, wherein the automatic reset circuit is connected to the power feed switching control circuit via a second time constant circuit configured to sustain a state of the reset.

(Supplementary Note 4)

The submarine branching apparatus according to supplementary note 1, wherein the power feed switching control circuit is connected to a first power source line and a second power source line, the automatic reset circuit is connected to the first power source line and the second power source line, and the automatic reset circuit short-circuits between the first power source line and the second power source line, and thereby the power feed switching control circuit is reset.

(Supplementary Note 5)

The submarine branching apparatus according to supplementary note 4, wherein the power feed switching control circuit is energized between the first power source line and the second power source line after being reset.

(Supplementary Note 6)

A control method of a submarine branching apparatus including:

converting, by a power feed switching control circuit, a relay-switching optical command signal into an electric signal;

receiving the electric signal, and changing a power feed path; and receiving the electric signal, and resetting the power feed switching control circuit.

(Supplementary Note 7)

The control method of the submarine branching apparatus according to supplementary note 6, wherein time elapses between changing the power feed path and resetting the power feed switching control circuit.

(Supplementary Note 8)

The control method of the submarine branching apparatus according to supplementary note 6, wherein a state of the reset is maintained for a fixed period of time.

(Supplementary Note 9)

The control method of the submarine branching apparatus according to supplementary note 6, wherein a state of the reset is caused by a short circuit between a first power source line and a second power source line connected to the power feed switching control circuit.

(Supplementary Note 10)

The control method of the submarine branching apparatus according to supplementary note 9, wherein the power feed switching control circuit is energized between the first power source line and the second power source line after being reset.

(Supplementary Note 11)

A non-transitory computer readable medium storing a program causing a submarine branching apparatus to execute:

converting, by a power feed switching control circuit, a relay-switching optical command signal into an electric signal;

receiving the electric signal, and changing a power feed path; and receiving the electric signal, and resetting the power feed switching control circuit.

(Supplementary Note 12)

The non-transitory computer readable medium according to supplementary note 11, further storing a program causing a submarine branching apparatus to execute that time elapses between changing the power feed path and resetting the power feed switching control circuit.

(Supplementary Note 13)

The non-transitory computer readable medium according to supplementary note 11, further storing a program causing a submarine branching apparatus to execute that a state of the reset is maintained for a fixed period of time.

(Supplementary Note 14)

The non-transitory computer readable medium according to supplementary note 11, further storing a program causing a submarine branching apparatus to execute that a state of the reset is caused by a short circuit between a first power source line and a second power source line connected to the power feed switching control circuit.

(Supplementary Note 15)

The non-transitory computer readable medium according to supplementary note 14, further storing a program causing a submarine branching apparatus to execute that the power feed switching control circuit is energized between the first power source line and the second power source line after being reset.

An example advantage according to the present disclosure is to provide a submarine branching apparatus that restarts and resets a power feed switching control circuit without stopping a system.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A submarine branching apparatus comprising:

a power feed switching control circuit configured to convert a relay-switching optical command signal into an electric signal;

a relay drive circuit configured to be connected to the power feed switching control circuit, receive the electric signal, and change a power feed path;

an automatic reset circuit configured to be connected to the power feed switching control circuit, receive the electric signal, and reset the power feed switching control circuit;

wherein the automatic reset circuit is connected to the power feed switching control circuit via a first time constant circuit configured to delay the electric signal to prevent relay switching from failing if the power feed switching control circuit is powered off first; and wherein the automatic reset circuit is connected to the power feed switching control circuit via a second time constant circuit configured to sustain a state of the reset to prevent an abnormal operation of the power feed switching control circuit due to a transient phenomenon if the power is turned on during a transient state.

2. The submarine branching apparatus according to claim 1, wherein the power feed switching control circuit is connected to a first power source line and a second power source line, the automatic reset circuit is connected to the first power source line and the second power source line, and the automatic reset circuit short-circuits between the first power source line and the second power source line, and thereby the power feed switching control circuit is reset.

3. The submarine branching apparatus according to claim 2, wherein the power feed switching control circuit is energized between the first power source line and the second power source line after being reset.

4. A control method of a submarine branching apparatus comprising:

converting, by a power feed switching control circuit, a relay-switching optical command signal into an electric signal;

receiving the electric signal, and changing a power feed path;

receiving the electric signal, and resetting the power feed switching control circuit;

wherein time elapses between changing the power feed path and resetting the power feed switching control circuit to prevent relay switching from failing if the power feed switching control circuit is powered off first; and wherein a state of the reset is maintained for a fixed period of time to prevent an abnormal operation of the power feed switching control circuit due to a transient phenomenon if the power is turned on during a transient state.

5. The control method of the submarine branching apparatus according to claim 4, wherein a state of the reset is caused by a short circuit between a first power source line and a second power source line connected to the power feed switching control circuit.

6. The control method of the submarine branching apparatus according to claim 5, wherein the power feed switching control circuit is energized between the first power source line and the second power source line after being reset.

7. A non-transitory computer readable medium storing a program causing a submarine branching apparatus to execute:

converting, by a power feed switching control circuit, a relay-switching optical command signal into an electric signal;

receiving the electric signal, and changing a power feed path;

receiving the electric signal, and resetting the power feed switching control circuit;

controlling a first time constant circuit to reset the power feed switching control circuit after a period of time has elapsed from changing the power feed path to prevent relay switching from failing if the power feed switching control circuit is powered off first; and controlling a second time constant circuit to execute that a state of the reset is maintained for a fixed period of time to prevent an abnormal operation of the power feed switching control circuit due to a transient phenomenon if the power is turned on during a transient state.

8. The non-transitory computer readable medium according to claim 7, further storing a program causing the submarine branching apparatus to control an automatic reset circuit to cause a state of the reset by a short circuit between a first power source line and a second power source line connected to the power feed switching control circuit.

9. The non-transitory computer readable medium according to claim 8, further storing a program causing the submarine branching apparatus to control the power feed switching control circuit to be energized between the first power source line and the second power source line after being reset.

* * * * *